(12) United States Patent
Yim

(10) Patent No.: US 11,030,510 B2
(45) Date of Patent: Jun. 8, 2021

(54) RADIO FREQUENCY INTEGRATED CIRCUIT OPERATING IN MULTIPLE MODES AND WIRELESS COMMUNICATION DEVICE INCLUDING THE SAME

(71) Applicant: Samsung Electronics Co., Ltd., Suwon-si (KR)

(72) Inventor: Joung-hyun Yim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 16/360,136

(22) Filed: Mar. 21, 2019

(65) Prior Publication Data

US 2019/0347534 A1    Nov. 14, 2019

(30) Foreign Application Priority Data

May 11, 2018  (KR) .......................... 10-2018-0054568

(51) Int. Cl.
    *G06K 19/077*   (2006.01)
    *H04B 1/44*     (2006.01)
(52) U.S. Cl.
    CPC .  *G06K 19/07752* (2013.01); *G06K 19/07766* (2013.01); *G06K 19/07775* (2013.01); *H04B 1/44* (2013.01)
(58) Field of Classification Search
    CPC ....... G06K 19/07752; G06K 19/07766; G06K 19/07775; H04B 1/44; H04B 1/581; H04B 1/401; H04B 1/04
    USPC ......................................................... 455/78
    See application file for complete search history.

(56) References Cited

U.S. PATENT DOCUMENTS

| 2,977,452 | A | * | 3/1961 | Weber ................ G05D 23/2754 219/499 |
| 8,805,299 | B2 |  | 8/2014 | Uejima |
| 9,397,720 | B2 |  | 7/2016 | Jerng et al. |
| 9,531,339 | B2 |  | 12/2016 | Papamichail et al. |
| 9,543,900 | B1 |  | 1/2017 | Lin et al. |
| 9,590,689 | B2 |  | 3/2017 | Knopik |

(Continued)

FOREIGN PATENT DOCUMENTS

| KR | 10-2014-0093053 |    | 7/2014 |
| WO | 2014026159 | A1 | 2/2014 |

OTHER PUBLICATIONS

Z. J-H.C, et al. "A 55nm CMOS 4-in-1 (11b/g/n, BT, FM, and GPS) Radio-In-a-Package with IPD Front-End Components Directly Connected to Antenna", RFIC. Papers, pp. 209-212, 2014.

(Continued)

*Primary Examiner* — Eugene Yun
(74) *Attorney, Agent, or Firm* — Muir Patent Law, PLLC

(57) ABSTRACT

A radio frequency integrated circuit (RFIC) includes a transmitting circuit configured to provide a first signal for transmission by an antenna in a transmitting mode, the transmitting circuit including a coil configured to be coupled to the antenna and at least one mode setting circuit configured to activate a resonant circuit including at least a portion of the coil in a receiving mode. The RFIC further includes a receiving circuit configured to receive a second signal received from the antenna in the receiving mode. Related wireless communication devices and communication circuits are provided.

17 Claims, 10 Drawing Sheets

(56) References Cited

U.S. PATENT DOCUMENTS

| | | | |
|---|---|---|---|
| 2001/0013075 A1* | 8/2001 | Otsuka | G06F 13/4072 710/33 |
| 2004/0043731 A1* | 3/2004 | Xiong | H04B 1/44 455/130 |
| 2010/0026459 A1* | 2/2010 | Seppa | G06K 7/0008 340/10.1 |
| 2011/0281531 A1 | 11/2011 | Chiang et al. | |
| 2016/0227603 A1 | 8/2016 | Huang et al. | |
| 2017/0250728 A1 | 8/2017 | Afsahi et al. | |

OTHER PUBLICATIONS

K.Bonhoon, et al."A Fully Integrated Dual-Mode CMOS Power Amplifier for WCDMA Applications", ISSCC Dig. Tech. Papers, pp. 82-84, Feb. 2012.

C. Yuan-Hung, et al. "Dual-Band Integrated Wi-Fi PAs with Load-Line Adjustment and Phase Compensated Power Detector" 2015 IEEE Radio Frequency integrated Circuits Symposium, pp. 223-226, 2015.

* cited by examiner

| | PW | sw1 | sw2 | sw3 |
|---|---|---|---|---|
| int PA | ON | open | open | open |
| Ext PA | OFF | close | close | close |
| Rx | OFF | close | open | close |

“RADIO FREQUENCY INTEGRATED CIRCUIT OPERATING IN MULTIPLE MODES AND WIRELESS COMMUNICATION DEVICE INCLUDING THE SAME”

CROSS-REFERENCE TO RELATED APPLICATION

This application claims the benefit of Korean Patent Application No. 10-2018-0054568, filed on May 11, 2018, in the Korean Intellectual Property Office, the disclosure of which is incorporated herein in its entirety by reference.

FIELD

The inventive concept relates to a radio frequency integrated circuit (RFIC), and more particularly, to an RFIC operating in multiple modes and a wireless communication device including the same.

BACKGROUND

A process of processing a signal for wireless communication may include various operations. For example, in an RFIC, amplification, filtering, mixing, etc. may be performed on a signal received via an antenna, and information may be extracted from the processed signal. In addition, to transmit a signal via the antenna, a signal including information may be processed through amplification, filtering, mixing, etc. in the RFIC, and the processed signal may be output via the antenna.

To perform amplification on a transmitting signal, amplification may be performed by an internal amplifier positioned inside the RFIC or an external amplifier positioned outside the RFIC. The RFIC may be in the form of a chip, and independently requires each of a port for transmitting a signal according to a position of the amplifier at the RFIC and a port for receiving a signal, which can increase an area of the RFIC and increase loss of transmitting and receiving signals.

SUMMARY

Some embodiments of the inventive concept can provide radio frequency integrated circuit (RFICs) having a reduced number of ports and reduced signal loss by operating differently in multiple modes, and a wireless communication devices including such RFICs.

According to an aspect of the inventive concept, a radio frequency integrated circuit (RFIC) includes a transmitting circuit configured to provide a first signal for transmission by an antenna in a transmitting mode, the transmitting circuit including a coil configured to be coupled to the antenna and at least one mode setting circuit configured to activate a resonant circuit including at least a portion of the coil in a receiving mode. The RFIC further includes a receiving circuit configured to receive a second signal received from the antenna in the receiving mode.

According to another aspect of the inventive concept, a wireless communication device includes an antenna and a radio frequency integrated circuit (RFIC) configured to transmit a first signal or receive a second signal via the antenna and connected to the antenna via a single port. The RFIC includes a transmitting circuit configured to selectively operate in a first transmitting mode, a second transmitting mode, and a receiving mode, wherein the transmitting circuit provides an amplified first signal to the port in the first transmitting mode and provides an unamplified first signal to the port in the second transmitting mode and a receiving circuit coupled to the port. The transmitting circuit includes a coil coupled to the port and at least one mode setting circuit configured to selectively set the transmitting circuit into the first transmitting mode, the second transmitting mode, and the receiving mode by selectively activating a resonant circuit including at least a portion of the coil of the transmitting circuit.

According to yet another aspect, a communication circuit includes a driver circuit configured to generate a pre-transmission signal, an amplifier configured to amplify the pre-transmission signal, and a transformer including a first coil coupled to an output of the amplifier and a second coil coupled to a port, wherein the second coil is divided into a first portion and a second portion. The communication circuit further includes a first mode setting circuit connected to a first node between the first portion and the second portion and configured to activate a first resonant circuit including the first portion of the second coil and a second mode setting circuit connected between a first input terminal of the amplifier and the first node and configured to active a second resonant circuit including the second portion of the second coil.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
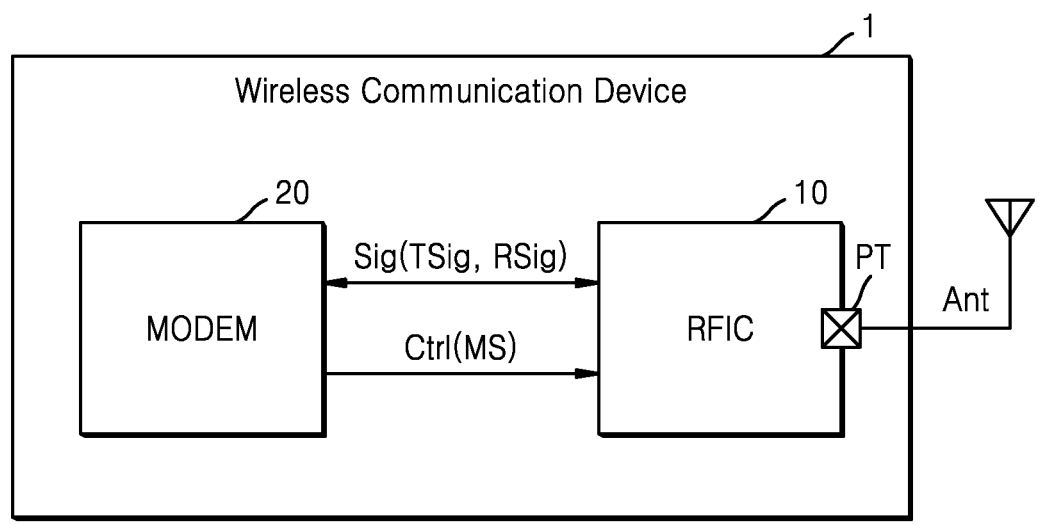
FIG. 1 is a diagram illustrating a wireless communication device according to some example embodiments.

FIG. 1 is a diagram illustrating a wireless communication device 1 according to some example embodiments.

Referring to FIG. 1, the wireless communication device 1 may include a radio frequency integrated circuit (RFIC) 10 and a modem 20. A wireless communication system where the wireless communication device 1 communicates with another device may be, as non-limiting examples, a wireless communication system using a cellular network, such as a $5^{th}$ generation (5G) wireless system, a long term evolution (LTE) system, an LTE-advanced system, a code division multiple access (CDMA) system, or a global system for mobile communications (GSM) system, a wireless local area network (WLAN) system such as wireless fidelity (Wi-Fi) or Bluetooth, or any other wireless communication system. Although the wireless communication system is described below mainly with reference to a WLAN system, it will be understood that example embodiments are not limited thereto.

The RFIC 10 may receive a signal from an external device (e.g., a wireless communications network) or transmit a signal to an external device via an antenna Ant connected to port PT. The RFIC 10 may include a transmitting circuit and a receiving circuit connected to the port PT. The RFIC 10 may process a transmitting signal TSig using the transmitting circuit based on a control signal Ctrl received from the modem 20, and may output the processed transmitting signal TSig via the antenna Ant. The RFIC 10 may process a receiving signal RSig received via the antenna Ant using the receiving circuit based on the control signal Ctrl received from the modem 20, and then may output the processed receiving signal RSig to the modem 20.

According to some example embodiments, the control signal Ctrl received from the modem 20 may include a mode setting signal MS, and the RFIC 10 may operate differently in transmitting and receiving modes based on the mode setting signal MS. Accordingly, the RFIC 10 may output the transmitting signal TSig via the antenna Ant or may receive the receiving signal RSig via the antenna Ant by using one port PT instead of respective different ports for transmitting and receiving modes.

According to some example embodiments, the wireless communication device 1 may further include an amplifier (not shown) positioned outside or inside the RFIC 10, and the RFIC 10 may operate differently based on the mode setting signal MS according to a position of the amplifier. Regardless of whether the amplifier is positioned inside or outside the RFIC 10, the RFIC 10 may output the transmitting signal TSig by using one port PT.

The modem 20 may output various control signals Ctrl for controlling the RFIC 10 according to transmitting and receiving modes to the RFIC 10. The various control signals Ctrl may include the mode setting signal MS for setting an operation mode of the RFIC 10. The RFIC 10 may have an internal amplification transmitting mode, an external amplification transmitting mode, and a receiving mode. In the present specification, an operation mode for amplifying and transmitting the transmitting signal TSig by using an internal amplifier positioned inside the RFIC 10 will be referred to as the internal amplification transmitting mode, and an operation mode for amplifying and transmitting the transmitting signal TSig by using an external amplifier positioned outside the RFIC 10 will be referred to as the external amplification transmitting mode.

In example embodiments in which the amplifier is positioned inside the RFIC 10, the modem 20 may output the mode setting signal MS corresponding to the internal amplification transmitting mode or the mode setting signal MS corresponding to the receiving mode to the RFIC 10. In response to the mode setting signal MS, the RFIC 10 may operate in the internal amplification transmitting mode or the receiving mode. In example embodiments in which the amplifier is positioned outside the RFIC 10, the modem 20 may output the mode setting signal MS corresponding to the external amplification transmitting mode or the mode setting signal MS corresponding to the receiving mode to the RFIC 10. In response to the mode setting signal MS, the RFIC 10 may operate in the external amplification transmitting mode or the receiving mode.

In some example embodiments, the RFIC 10 may include at least one mode setting circuit for setting an operation mode of the RFIC 10 by using resonance. The mode setting signal MS may include a switching signal for the mode setting circuit. This will be described below with reference to FIG. 3.

Figure 2A:
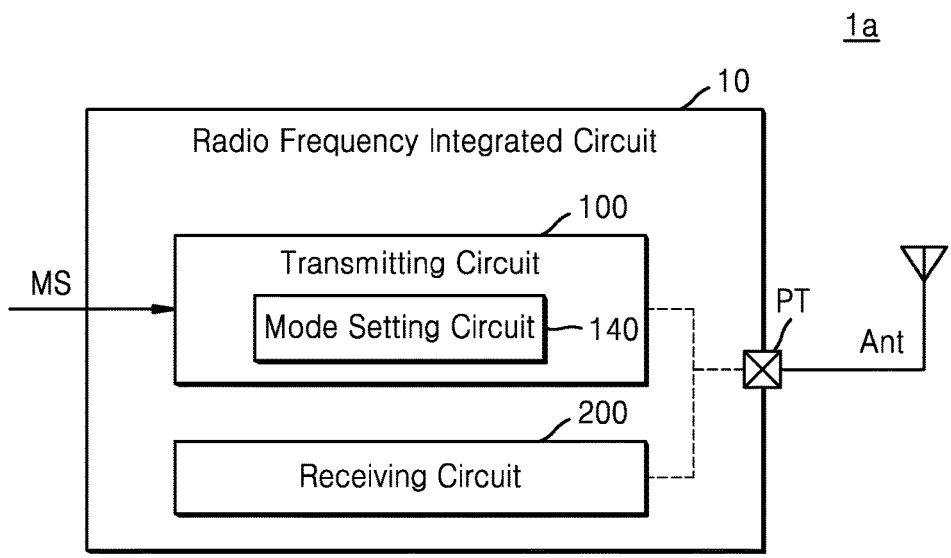
FIG. 2A is a block diagram illustrating a wireless communication device according to some example embodiments.

FIG. 2A is a block diagram illustrating a wireless communication device 1a according to some example embodiments. In detail, FIG. 2A is a block diagram illustrating a wireless communication device that performs amplification at the inside of an RFIC.

Referring to FIG. 2A, the wireless communication device 1a may include the RFIC 10 and the antenna Ant. The RFIC 10 may include a transmitting circuit 100 and a receiving circuit 200. In addition, since the RFIC 10 internally performs amplification, the RFIC 10 may be directly connected to the antenna Ant via the port PT without passing through an external amplifier.

The transmitting circuit 100 may include at least one mode setting circuit 140. The mode setting circuit 140 may set a mode for operating the transmitting circuit 100 based on the mode setting signal MS received from the modem 20 (of FIG. 1). In some example embodiments, the mode setting signal MS may be an internal amplification transmitting mode, and the mode setting circuit 140 may set the transmitting circuit 100 to the internal amplification transmitting mode. The transmitting circuit 100 may amplify a transmitting signal received from a modem by using an internal amplifier and may output the amplified transmitting signal to the outside via the antenna Ant. In some example embodiments, the mode setting signal MS may be a receiving mode, and the mode setting circuit 140 may set the transmitting circuit 100 to the receiving mode.

In an example, the mode setting circuit 140 may increase the impedance of the transmitting circuit 100 by using resonance in the receiving mode, and thus, a receiving signal received from the antenna Ant may be input to the receiving circuit 200 instead of the transmitting circuit 100. The receiving circuit 200 may remove noise from the receiving signal and may amplify and output the receiving signal to the modem. Although not illustrated, the receiving circuit 200 may include an impedance matching circuit for performing impedance matching between the receiving circuit 200 and the antenna Ant.

According to some example embodiments, when amplification of a transmitting signal occurs at the inside of the RFIC 10, the mode setting circuit 140 may set an internal amplification mode or a receiving mode as an operation mode for the transmitting circuit 100 by using resonance, and as the operation mode is set without a switch element between the transmitting circuit 100 and the port PT, loss of transmitting and receiving signals may be minimized. Signals may be transmitted and received via one port PT, and thus, an area of the RFIC 10 may be decreased.

Figure 2B:
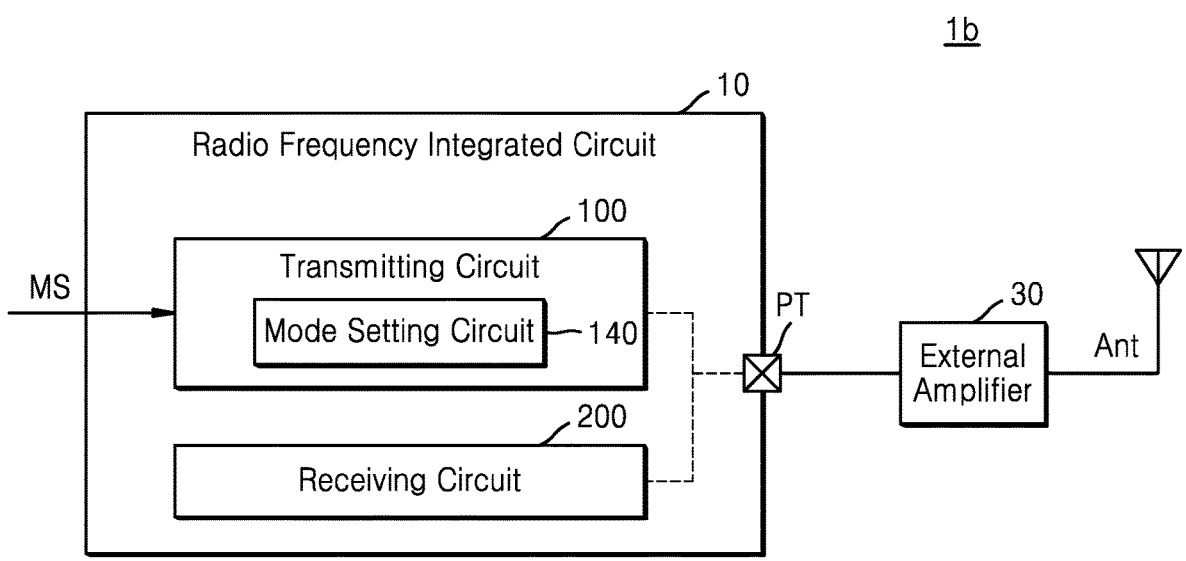
FIG. 2B is a block diagram illustrating a wireless communication device according to some example embodiments.

FIG. 2B is a block diagram illustrating a wireless communication device 1b according to some example embodiments. In detail, FIG. 2B is a block diagram illustrating a wireless communication device that performs amplification outside of an RFIC.

Referring to FIG. 2B, the wireless communication device 1b may include the RFIC 10, an external amplifier 30, and the antenna Ant, and the RFIC 10 may include the transmitting circuit 100 and the receiving circuit 200. The RFIC 10 is connected to the external amplifier 30 via the port PT.

The mode setting circuit 140 may set an operation mode for the transmitting circuit 100 based on the mode setting signal MS received from the modem 20 (of FIG. 1). In some example embodiments, the mode setting signal MS may indicate an external amplification transmitting mode, and the transmitting circuit 100 may be set into the external amplification transmitting mode according to an operation of the mode setting circuit 140. In some example embodiments, the mode setting circuit 140 may form a bypass path capable of outputting a transmitting signal to the port PT without passing through an internal amplifier included in the transmitting circuit 100 by using resonance. The transmitting circuit 100 may not amplify a transmitting signal received from a modem by using the bypass path and may output the transmitting signal to the external amplifier 30 via the port PT. The external amplifier 30 may amplify the received transmitting signal and may output the amplified transmitting signal to the outside via the antenna Ant.

In some example embodiments, the mode setting signal MS may indicate a receiving mode, and the transmitting circuit 100 may be set into the receiving mode according to an operation of the mode setting circuit 140. The mode setting circuit 140 may increase impedance of the transmitting circuit 100 by using resonance in the receiving mode. In an example, the external amplifier 30 may include a bypass circuit for outputting, when receiving a signal, the signal to the RFIC 10, and a receiving signal received from the external amplifier 30 via the bypass circuit may be input to the receiving circuit 200 instead of the transmitting circuit 100. The receiving circuit 200 may remove noise from the receiving signal and may amplify and output the receiving signal to the modem.

According to some example embodiments, when amplification of a transmitting signal occurs at the outside of the RFIC 10, the mode setting circuit 140 may cause resonance for setting, based on the mode setting signal MS, an external amplification transmitting mode or a receiving mode as an operation mode for the transmitting circuit 100, and as the operation mode is set without a switch element between the transmitting circuit 100 and the port PT, loss of transmitting and receiving signals may be minimized. In addition, signals may be transmitted and received via one port PT, and thus, an area of the RFIC 10 may be decreased.

Figures 3, 4:
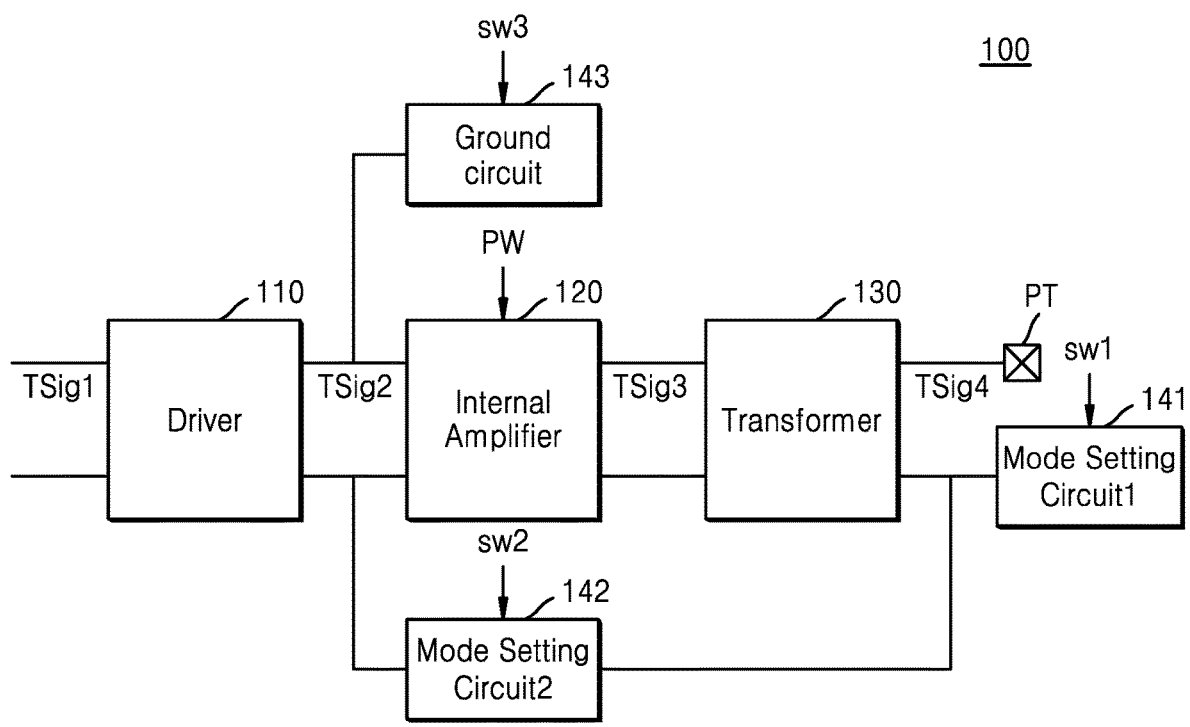
FIG. 3 is a block diagram illustrating a transmitting circuit according to some example embodiments.
FIG. 4 is a table showing a mode setting signal for each operation mode of a transmitting circuit according to some example embodiments.

FIG. 3 is a block diagram illustrating the transmitting circuit 100 according to some example embodiments. Referring to FIG. 3, the transmitting circuit 100 may include a driver 110, an internal amplifier 120, a transformer 130, a first mode setting circuit 141, a second mode setting circuit 142, a ground circuit 143, and the port PT. The driver 110 may generate a second transmitting signal TSig2 by amplifying a first transmitting signal TSig1. The internal amplifier 120 may amplify the second transmitting signal TSig2 to produce a third transmitting signal TSig3 when receiving a power signal PW, and the transformer 130 may output a fourth transmitting signal TSig4 generated by adjusting an amplitude of the third transmitting signal TSig3 to an antenna via the port PT.

The first mode setting circuit 141 may be connected to the transformer 130 and may determine, based on a first switching signal sw1 received from the modem 20 (of FIG. 1), an operation mode for the transmitting circuit 100. In some example embodiments, the first mode setting circuit 141 may cause resonance for at least a portion of a coil included in the transformer 130 based on the first switching signal sw1 and thus may determine an operation mode for the transmitting circuit 100.

The second mode setting circuit 142 may be connected between the transformer 130 and an input end of the internal amplifier 120 and may determine, based on a second switching signal sw2 received from the modem 20 (of FIG. 1), an operation mode for the transmitting circuit 100. In some example embodiments, the second mode setting circuit 142 may cause resonance for at least a portion of a coil included in the transformer 130 based on the second switching signal sw2 and thus may determine an operation mode for the transmitting circuit 100.

In the present specification, an operation in which the first and second mode setting circuits 141 and 142 cause resonance for at least a portion of a coil included in the transformer 130 may be referred to as a resonating operation. Based on a mode setting signal, the first and second mode setting circuits 141 and 142 may differ whether to perform the resonating operation from each other, and thus, the first and second mode setting circuits 141 and 142 may set an operation mode for the transmitting circuit 100.

The ground circuit 143 may be connected to an input end of the internal amplifier 120 and may determine, based on a third switching signal sw3 received from the modem 20 (of FIG. 1), an operation mode for the transmitting circuit 100.

In some example embodiments, the first mode setting circuit 141, the second mode setting circuit 142, and the ground circuit 143 may each include a switch element, and the first to third switching signals sw1 to sw3 may be open/close signals for the switch element included in each corresponding component.

In an internal amplification transmitting mode, the internal amplifier 120 may receive the power signal PW and thus may amplify the second transmitting signal TSig2 to produce the third transmitting signal TSig3. In addition, based on the first to third switching signals sw1 to sw3, the first mode setting circuit 141, the second mode setting circuit 142, and the ground circuit 143 may control the second transmitting signal TSig2 by using the internal amplifier 120 to amplify the second transmitting signal TSig2 to produce the third transmitting signal TSig3 and may control the third transmitting signal TSig3 by using the transformer 130 to produce the fourth transmitting signal TSig4 from the third transmitting signal TSig3. The fourth transmitting signal Tsig4 generated by the transformer 130 may be output to the antenna via the port PT. The internal amplification transmitting mode will be described below with reference to FIGS. 5A and 5B.

In an external amplification transmitting mode, the internal amplifier 120 may not receive the power signal PW. In addition, based on the first to third switching signals sw1 to sw3, the first mode setting circuit 141, the second mode setting circuit 142, and the ground circuit 143 may control the transmitting circuit 100 such that the second transmitting signal TSig2 is not amplified by the internal amplifier 120. Accordingly, the unamplified second transmitting signal TSig2 may be output to the external amplifier 30 (of FIG. 2B) via the port PT. The external amplification transmitting mode will be described below with reference to FIGS. 6A and 6B.

In a receiving mode, the internal amplifier 120 may not receive the power signal PW. In addition, based on the first to third switching signals sw1 to sw3, the first mode setting circuit 141, the second mode setting circuit 142, and the ground circuit 143 may control the transmitting circuit 100 to have sufficiently high impedance to not receive a receiving signal. In an example, the first mode setting circuit 141, the second mode setting circuit 142, and the ground circuit 143 may control an impedance of the transmitting circuit 100 such that the impedance is relatively high such that a receiving signal may not be received by the transmitting circuit 100. The receiving mode will be described below with reference to FIGS. 7A and 7B.

FIG. 4 is a table showing a mode setting signal for each operation mode of a transmitting circuit according to some example embodiments.

Referring to FIGS. 1, 3, and 4, the mode setting signal MS may include the power signal PW, the first switching signal sw1, the second switching signal sw2, and the third switching signal sw3. As illustrated in FIG. 3, the power signal PW may be input to the internal amplifier 120, the first switching signal sw1 may be input to a first switch included in the first mode setting circuit 141, the second switching signal sw2 may be input to a second switch included in the second mode setting circuit 142, and the third switching signal sw3 may be input to a third switch included in the ground circuit 143.

In an internal amplification transmitting mode int PA, the power signal PW may be controlled such that the internal amplifier 120 operates (is "ON") and the first switching signal sw1 may be controlled to open the first switch, and thus, the first mode setting circuit 141 does not operate. In addition, the second switching signal sw2 may be controlled to open the second switch, and thus, the second mode setting circuit 142 may be disabled. The third switching signal sw3 may be controlled to open the third switch, and thus, the ground circuit 143 may be disabled. As a result, in the internal amplification transmitting mode int PA, the transmitting circuit 100 may output a transmitting signal amplified by the internal amplifier 120 to the outside via the port PT.

In an external amplification transmitting mode ext PA, the power signal PW may be controlled such that the internal amplifier 120 does not operate (is "OFF") and the first switching signal sw1 may be controlled to close the first switch, and thus, the first mode setting circuit 141 may operate. In addition, the second switching signal sw2 may be controlled to close the second switch, and thus, the second mode setting circuit 142 may operate. The third switching signal sw3 may be controlled to close the third switch, and thus, the ground circuit 143 may operate. As a result, in the external amplification transmitting mode ext PA, the transmitting circuit 100 may output a transmitting signal that is not amplified by the internal amplifier 120 to the outside via the port PT.

In a receiving mode Rx, the power signal PW may be controlled such that the internal amplifier 120 does not operate (OFF) and the first switching signal sw1 may be controlled to close the first switch, and thus, the first mode setting circuit 141 may operate. In addition, the second switching signal sw2 may be controlled to open the second switch, and thus, the second mode setting circuit 142 does not operate. The third switching signal sw3 may be controlled to close the third switch, and thus, the ground circuit 143 may operate. As a result, in the receiving mode Rx, the transmitting circuit 100 may have sufficiently high impedance and thus may not receive a receiving signal. Although FIG. 4 illustrates the third switching signal sw3 being closed in the receiving mode Rx, the third switching signal sw3 may be open in another example embodiment.

Figure 5A:
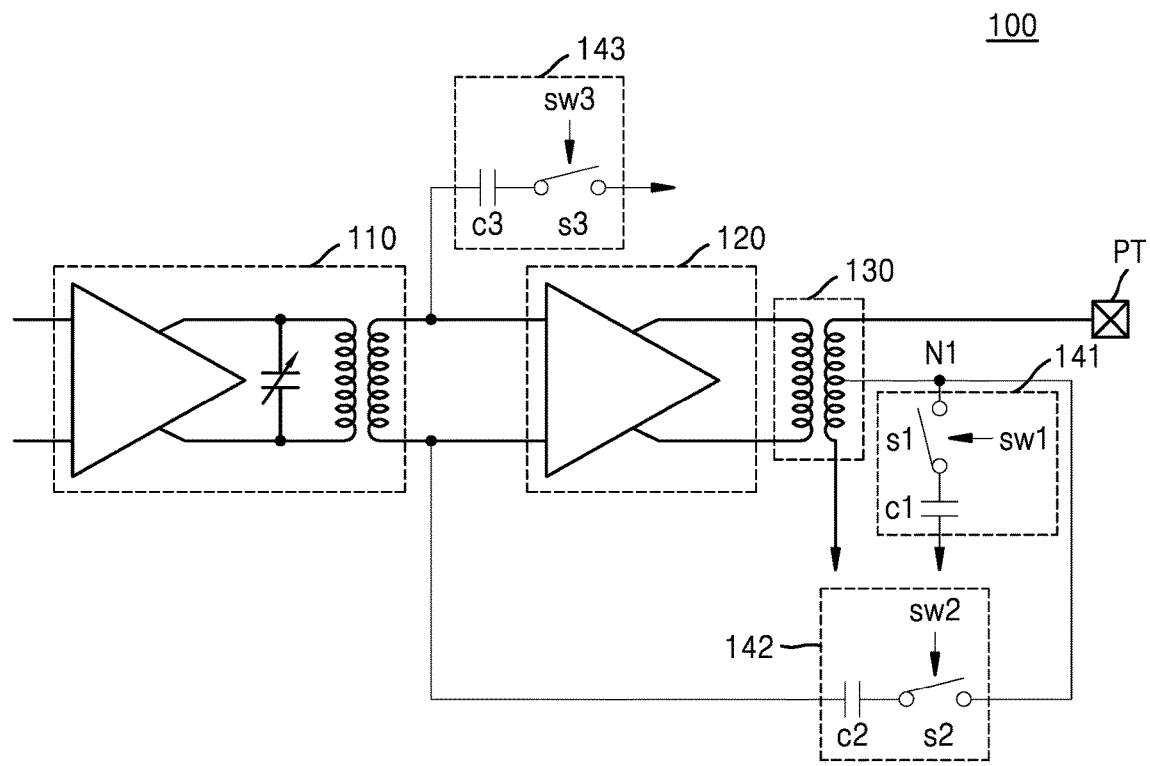
FIG. 5A is a circuit diagram illustrating a transmitting circuit according to some example embodiments.
Figure 5B:
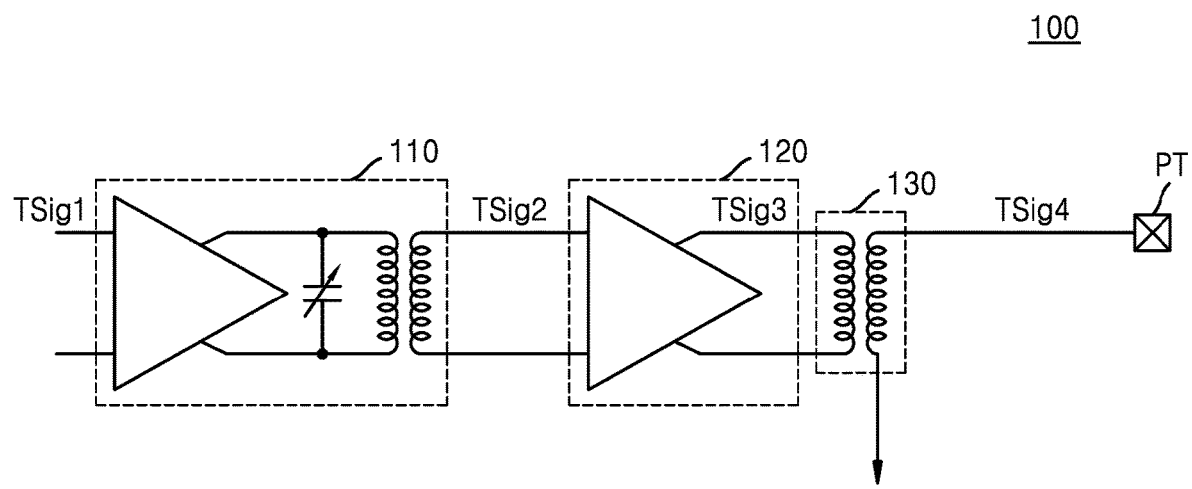
FIG. 5B is an equivalent circuit diagram of the transmitting circuit of FIG. 5A.

FIG. 5A is a circuit diagram illustrating the transmitting circuit 100 according to some example embodiments, and FIG. 5B is an equivalent circuit diagram of the transmitting circuit 100 of FIG. 5A. In detail, FIGS. 5A and 5B are circuit diagrams illustrating a transmitting circuit operating in an internal amplification transmitting mode.

Referring to FIG. 5A, the transmitting circuit 100 may include the driver 110, the internal amplifier 120, the transformer 130, the first mode setting circuit 141, the second mode setting circuit 142, and the ground circuit 143. In addition, the first mode setting circuit 141 may include a first capacitor c1 and a first switch s1, the second mode setting circuit 142 may include a second capacitor c2 and a second switch s2, and the ground circuit 143 may include a third capacitor c3 and a third switch s3. The first switch s1 may control coupling between a first node N1 and the first capacitor c1 based on the first switching signal sw1, the second switch s2 may control coupling between a second node N2 and the second capacitor c2 based on the second switching signal sw2, and the third switch s3 may control coupling between a ground node and the third capacitor c3 based on the third switching signal sw3.

As described above with reference to FIG. 4, in the case of operating in an internal amplification transmitting mode, power is applied to the internal amplifier 120, and thus, the internal amplifier 120 may operate. The first switch s1 may open between the first node N1 and the first capacitor c1 based on the first switching signal sw1, the second switch s2 may open between the first node N1 and the second capacitor c2 based on the second switching signal sw2, and the third switch s3 may open between the third capacitor c3 and the ground node based on the third switching signal sw3. Accordingly, the first mode setting circuit 141, the second mode setting circuit 142, and the ground circuit 143 does not operate. As a result, the transmitting circuit 100 of FIG. 5A may configure an equivalent circuit as illustrated in FIG. 5B.

Referring to FIG. 5B, the driver 110 may output the second transmitting signal TSig2 generated by receiving and processing the first transmitting signal TSig1 to the internal amplifier 120. The internal amplifier 120 may output the third transmitting signal TSig3 generated by amplifying the second transmitting signal TSig2 to the transformer 130. The transformer 130 may output the fourth transmitting signal TSig4 generated by adjusting an amplitude of the third transmitting signal TSig3 to the port PT.

According to some embodiments of the inventive concept, the first mode setting circuit 141, the second mode setting circuit 142, and the ground circuit 143 may perform an operation for setting the transmitting circuit 100 into an internal amplification transmitting mode in which a transmitting signal is output in an amplified state based on the mode setting signals sw1, sw2, and sw3 and may use one transmitting circuit 100 to operate in a plurality of transmitting modes without a switching element on a signal transmitting route. Accordingly, loss of signals, which may occur in the signal transmitting route, may be minimized.

Figure 6A:
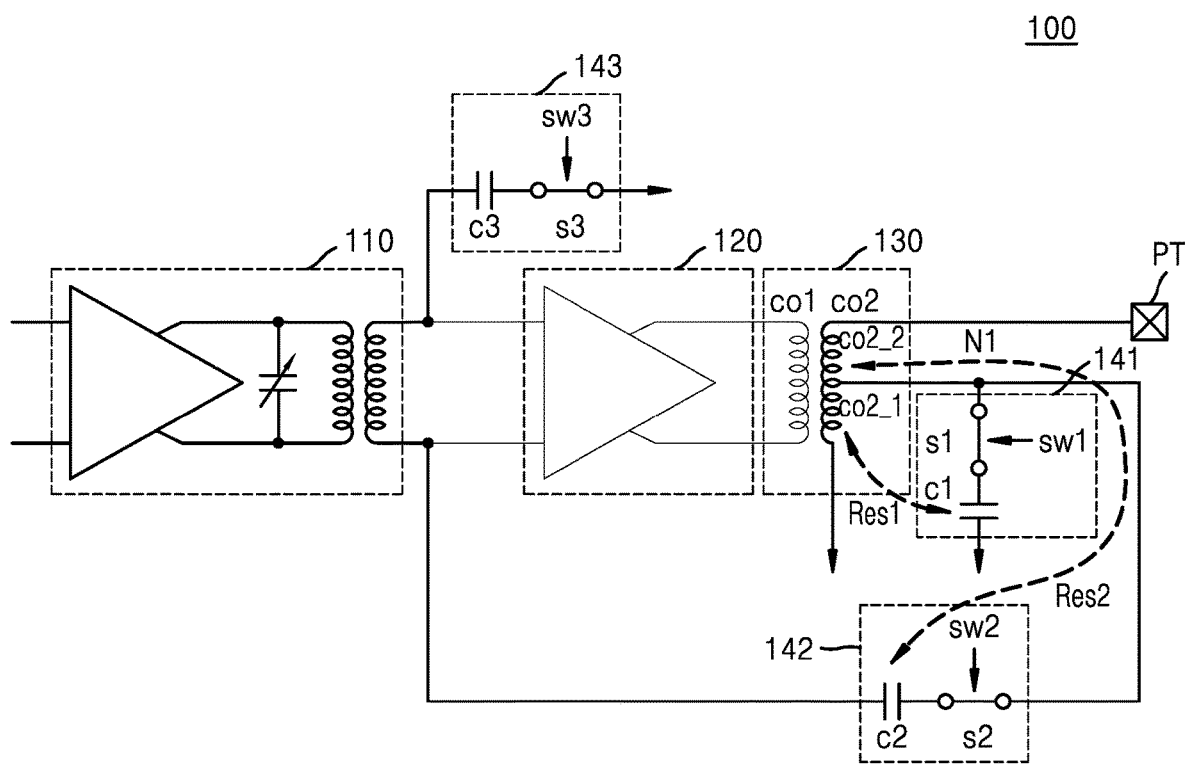
FIG. 6A is a circuit diagram illustrating a transmitting circuit according to some example embodiments.
Figure 6B:
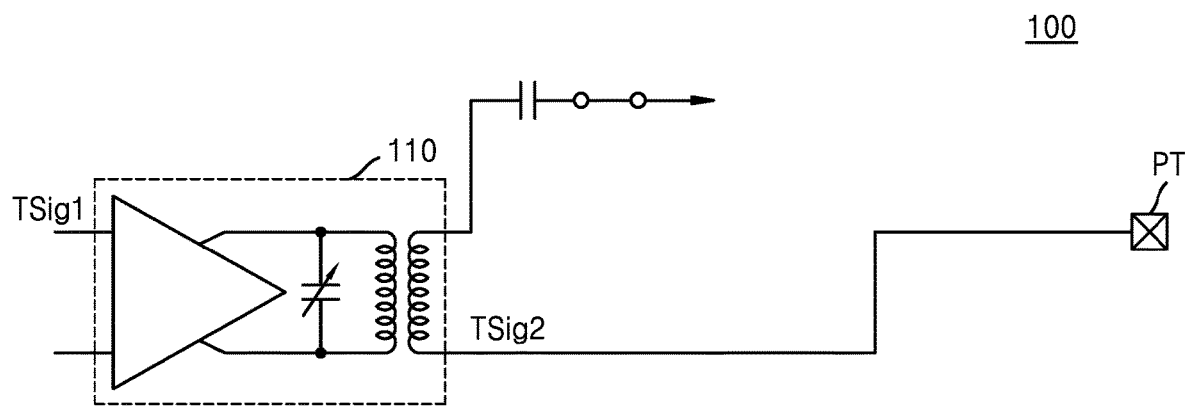
FIG. 6B is an equivalent circuit diagram of the transmitting circuit of FIG. 6A.

FIG. 6A is a circuit diagram illustrating the transmitting circuit 100 according to some example embodiments, and FIG. 6B is an equivalent circuit diagram of the transmitting circuit 100 of FIG. 6A. In detail, FIGS. 6A and 6B are circuit diagrams illustrating a transmitting circuit operating in an external amplification transmitting mode. A repeated description of FIG. 5A is omitted below.

Referring to FIG. 6A, the transmitting circuit 100 may include the driver 110, the internal amplifier 120, the transformer 130, the first mode setting circuit 141, the second mode setting circuit 142, and the ground circuit 143. The transformer 130 may include a first coil Co1 and a second coil Co2, and the second coil Co2 may be divided into a first portion Co2_1 and a second portion Co2_2 according to a position where the first node N1 is connected. In some example embodiments, the first node N1 may be connected to a position where a turns ratio of the coil included in the first portion Co2_1 and the second portion Co2_2 is 1:1.

As described above with reference to FIG. 4, in the case of operating in an external amplification transmitting mode, power is not applied to the internal amplifier 120, and thus, the internal amplifier 120 does not operate. The first switch s1 may close between the first node N1 and the first capacitor c1 based on the first switching signal sw1, the second switch s2 may close between the first node N1 and the second capacitor c2 based on the second switching signal sw2, and the third switch s3 may close between the third capacitor c3 and the ground node based on the third switching signal sw3. Accordingly, the first mode setting circuit 141, the second mode setting circuit 142, and the ground circuit 143 may operate.

The first capacitor c1 included in the first mode setting circuit 141 may cause resonance Res1 with the first portion Co2_1 of the second coil Co2. The first capacitor c1 is connected to the first portion Co2_1 of the second coil Co2 in parallel, and thus, the first portion Co2_1 of the second coil Co2 and the first capacitor c1 may provide a high impedance at the node N1 due to the resonance Res1. In some example embodiments, to cause resonance with the first portion Co2_1 of the second coil Co2, the first capacitor c1 may have a capacitance C1 shown below with respect to an operation frequency f of the transmitting circuit 100 and an inductance L1 of the first portion Co2_1.

$$C1 = \frac{1}{4\pi^2 f^2 L1}$$

In addition, the second capacitor c2 included in the second mode setting circuit 142 may cause resonance Res2 with the second portion Co2_2 of the second coil Co2. The second capacitor c2 is connected to the second portion Co2_2 of the second coil Co2 in series, and thus, the second portion Co2_2 of the second coil Co2 and the second capacitor c2 may provide a low impedance across the second capacitor c2 due to the resonance Res2. In some example embodiments, to cause resonance with the second portion Co2_2 of the second coil Co2, the second capacitor c2 may have a capacitance C2 shown below with respect to the operation frequency f of the transmitting circuit 100 and an inductance L2 of the second portion Co2_2.

$$C2 = \frac{1}{4\pi^2 f^2 L2}$$

As described above, the second portion Co2_2 of the second coil Co2 and the second capacitor c2 may provide a low impedance and the first portion Co2_1 of the second coil Co2 and the first capacitor c1 may provide a high impedance. In addition, since the internal amplifier 120 does not operate, the first coil Co1 does not operate, either, and thus, as a result, the transmitting circuit 100 of FIG. 6A may configure an equivalent circuit as illustrated in FIG. 6B.

Referring to FIG. 6B, the driver 110 may output the second transmitting signal TSig2 generated by receiving and processing the first transmitting signal TSig1 to the port PT without passing through the internal amplifier 120. The second transmitting signal TSig2 output without passing through the internal amplifier 120 may be amplified by an external amplifier (for example, the external amplifier 30 of FIG. 2B) positioned outside the transmitting circuit 100.

According to some embodiments of the inventive concept, the first mode setting circuit 141, the second mode setting circuit 142, and the ground circuit 143 may perform an operation for setting the transmitting circuit 100 into an external amplification transmitting mode in which a transmitting signal is output in an unamplified state based on the mode setting signals sw1, sw2, and sw3. Accordingly, an RFIC according to the inventive concept of the disclosure may use one transmitting circuit 100 to transmit a transmitting signal while minimizing loss of the transmitting signal regardless of a position of an amplifier.

Figure 7A:
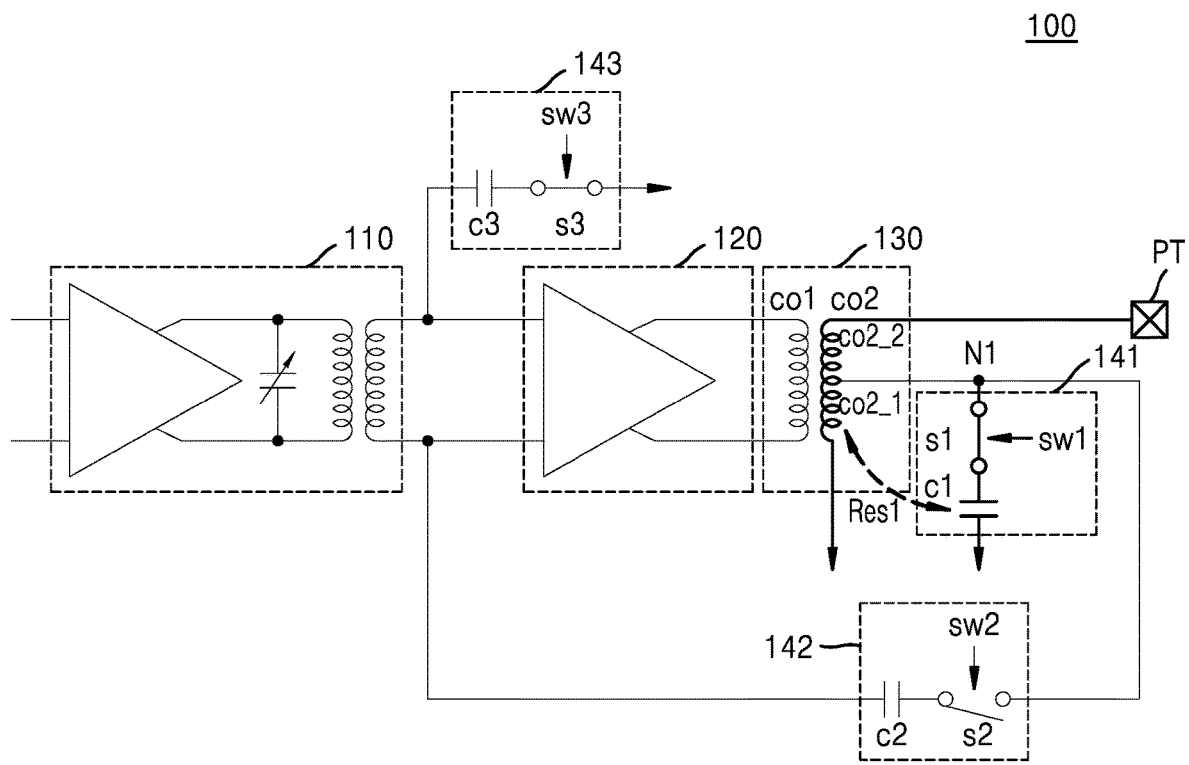
FIG. 7A is a circuit diagram illustrating a transmitting circuit according to some example embodiments.
Figure 7B:
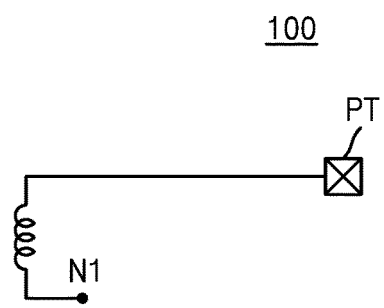
FIG. 7B is an equivalent circuit diagram of the transmitting circuit of FIG. 7A.

FIG. 7A is a circuit diagram illustrating the transmitting circuit 100 according to some example embodiments, and FIG. 7B is an equivalent circuit diagram of the transmitting circuit 100 of FIG. 7A. In detail, FIGS. 7A and 7B are circuit diagrams illustrating a transmitting circuit operating in a receiving mode.

Referring to FIG. 7A, the transmitting circuit 100 may include the driver 110, the internal amplifier 120, the transformer 130, the first mode setting circuit 141, the second mode setting circuit 142, and the ground circuit 143.

As described above with reference to FIG. 4, in the case of operating in a receiving mode, power is not applied to the internal amplifier 120, and thus, the internal amplifier 120 does not operate. The first switch s1 may close between the first node N1 and the first capacitor c1 based on the first switching signal sw1, and thus, the first mode setting circuit 141 may operate. The second switch s2 may open between the first node N1 and the second capacitor c2 based on the second switching signal sw2. Thus, the second mode setting circuit 142 does not operate.

The first capacitor c1 included in the first mode setting circuit 141 may cause the resonance Res1 with the first portion Co2_1 of the second coil Co2. The first capacitor c1 is connected to the first portion Co2_1 of the second coil Co2 in parallel, and thus, the first portion Co2_1 of the second coil Co2 and the first capacitor c1 may provide a high impedance due to the resonance Res1. In some example embodiments, to cause resonance with the first portion Co2_1 of the second coil Co2, the first capacitor c1 may have the capacitance C1 shown below with respect to the operation frequency f of the transmitting circuit 100 and the inductance L1 of the first portion Co2_1.

$$C1 = \frac{1}{4\pi^2 f^2 L1}$$

As described above, since the first portion Co2_1 of the second coil Co2 and the first capacitor c1 are open, the second switch s2 is open, and the internal amplifier 120 does not operate, the first coil Co1 does not operate. As a result, the transmitting circuit 100 of FIG. 7A may provide an equivalent circuit as illustrated in FIG. 7B.

Referring to FIG. 7B, as the first portion Co2_1 of the second coil Co2 and the first capacitor c1 provide a high impedance due to the resonance Res1, and the second switch s2 is also open, the first node N1 may be an open node. Accordingly, impedance of the transmitting circuit 100 viewed from the port PT may be high, and a receiving signal may be input to the receiving circuit 200 (of FIG. 2B) instead of being input to the transmitting circuit 100.

According to some embodiments of the inventive concept of the disclosure, the first mode setting circuit 141, the second mode setting circuit 142, and the ground circuit 143 may set, based on a mode setting signal such as the first to third switching signals sw1, sw2, and sw3, impedance of the transmitting circuit 100 to be significantly high in the receiving mode, and an RFIC according to the inventive concept of the disclosure may operate in a plurality of transmitting and receiving modes by using one transmitting circuit 100.

Figure 8:
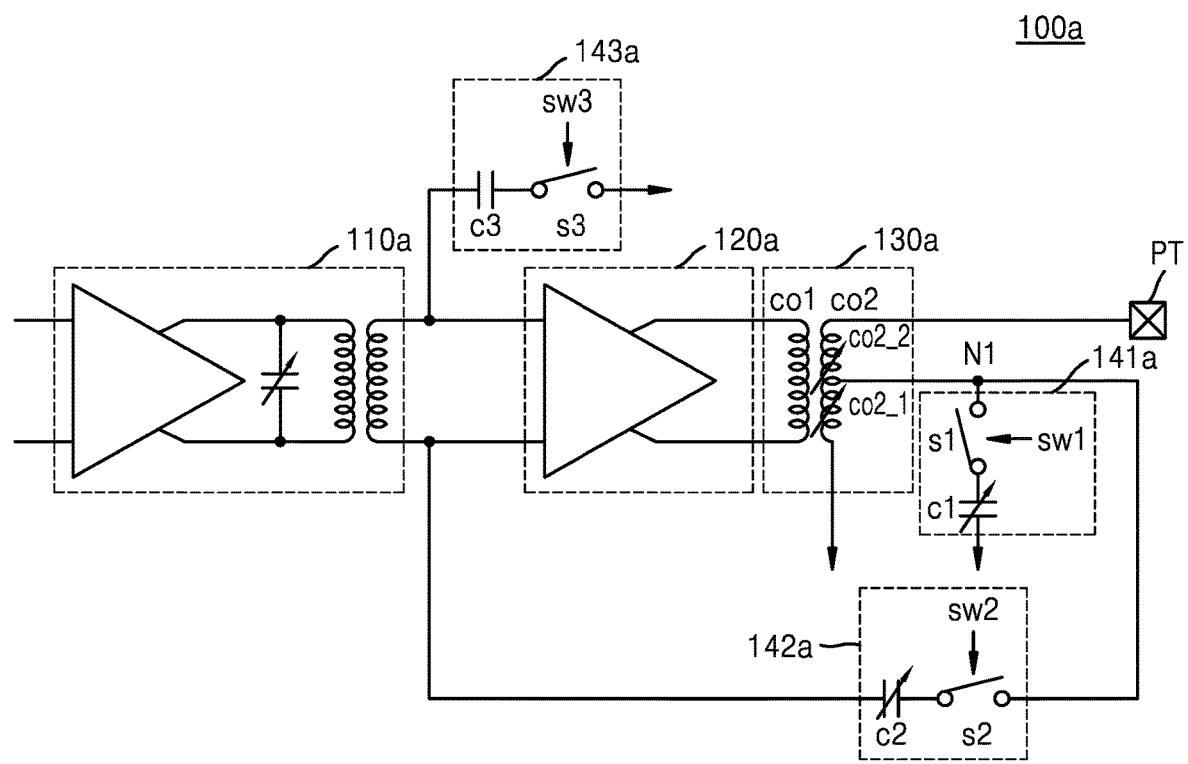
FIG. 8 is a circuit diagram illustrating a transmitting circuit according to some example embodiments.

FIG. 8 is a circuit diagram illustrating a transmitting circuit 100a according to some example embodiments. In detail, FIG. 8 is a circuit diagram illustrating a transmitting circuit changeable according to an operation frequency.

Referring to FIG. 8, the transmitting circuit 100a may include a driver 110a, an internal amplifier 120a, a transformer 130a, a first mode setting circuit 141a, a second mode setting circuit 142a, and a ground circuit 143a. The transformer 130a may include the first coil Co1 and the second coil Co2, and the second coil Co2 may be divided into the second portion Co2_2 and the first portion Co2_1 according to a position where the first node N1 is connected. In addition, the first mode setting circuit 141a may include the first capacitor c1 and the first switch s1, the second mode setting circuit 142a may include the second capacitor c2 and the second switch s2, and the ground circuit 143a may include the third capacitor c3 and the third switch s3. The driver 110a and the internal amplifier 120a are the same as or similar to the driver 110 and the internal amplifier 120 of FIG. 5A, and thus, a repeat description thereof is omitted below.

The transmitting circuit 100a may operate based on a unique operation frequency. As an example, an operation frequency of the transmitting circuit 100a may be determined based on a wireless communication network in use. To cause resonance according to the inventive concept of the disclosure, the following equation should be established between the capacitance C1 of the first capacitor c1, the inductance L1 of the first portion Co2_1, and the operation frequency f:

$$f = \frac{1}{2\pi\sqrt{L1 \cdot C1}}$$

In addition, the following equation should be established between the capacitance C2 of the second capacitor c2, the inductance L2 of the second portion Co2_2, and the operation frequency f:

$$f = \frac{1}{2\pi\sqrt{L2 \cdot C2}}$$

According to some example embodiments, the first capacitor c1 and the second capacitor c2 may be variable capacitances, and the second portion Co2_2 and the first portion Co2_1 may be variable inductances. At least some of the capacitance C1 of the first capacitor c1, the capacitance C2 of the second capacitor c2, the inductance L1 of the first portion Co2_1, and the inductance L2 of the second portion Co2_2 may change, and thus, the transmitting circuit 100a may operate in a plurality of transmitting and receiving modes even if the operation frequency f is changed.

Figure 9:
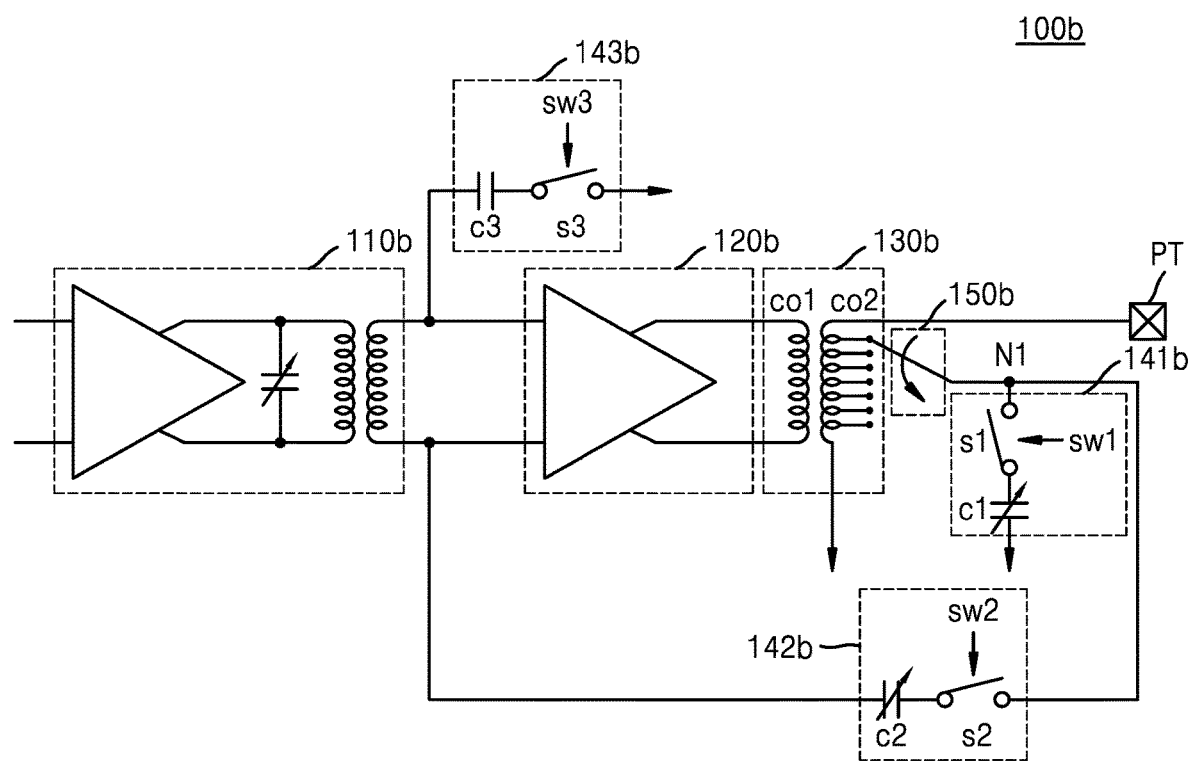
FIG. 9 is a circuit diagram illustrating a transmitting circuit according to some example embodiments.

FIG. 9 is a circuit diagram illustrating a transmitting circuit 100b according to some example embodiments. In detail, FIG. 9 is a circuit diagram illustrating a transmitting circuit capable of determining a position of the second coil Co2, which is connected to the first node N1.

Referring to FIG. 9, the transmitting circuit 100b may include a driver 110b, an internal amplifier 120b, a transformer 130b, a first mode setting circuit 141b, a second mode setting circuit 142b, a ground circuit 143b, and a turns ratio switch 150b. The transformer 130b may include the first coil Co1 and the second coil Co2, and the second coil Co2 may be divided into a first portion and a second portion according to a position where the first node N1 is connected. In addition, the first mode setting circuit 141b may include the first capacitor c1 and the first switch s1, the second mode setting circuit 142b may include the second capacitor c2 and the second switch s2, and the ground circuit 143b may include the third capacitor c3 and the third switch s3. The driver 110b, the internal amplifier 120b, and the ground circuit 143b are the same as or similar to the driver 110, the internal amplifier 120, and the ground circuit 143 of FIG. 5A, and thus, a repeat description thereof is omitted below.

The turns ratio switch 150b may adjust a position where the second coil Co2 is connected to the first node N1. That is, the turns ratio switch 150b may variously adjust a turns ratio between a first portion that causes resonance with the first capacitor c1 and a second portion that causes resonance with the second capacitor c2. In addition, inductances of the first portion and the second portion may change according to adjustment of the turns ratio, and a capacitance of the first capacitor c1 and a capacitance of the second capacitor c2 may also be adjusted.

Figure 10:
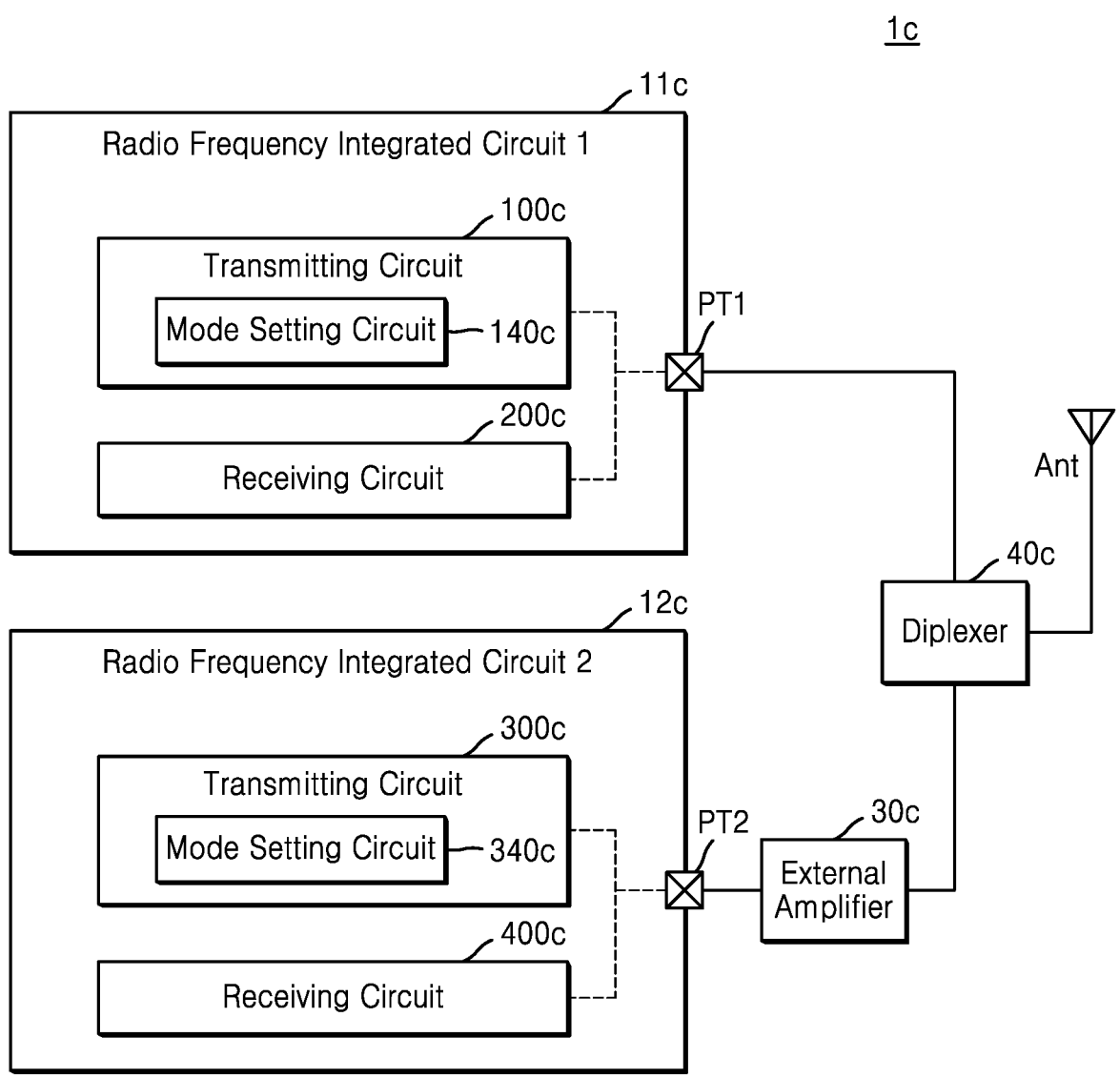
FIG. 10 is a block diagram illustrating a wireless communication device according to some example embodiments.

FIG. 10 is a block diagram illustrating a wireless communication device 1c according to some example embodiments.

Referring to FIG. 10, the wireless communication device 1c may include a first RFIC 11c, a second RFIC 12c, an external amplifier 30c, and a diplexer 40c. The first RFIC 11c may include a first transmitting circuit 100c including at least one mode setting circuit 140c and a first receiving circuit 200c, and the second RFIC 12c may include a second transmitting circuit 300c including at least one mode setting circuit 340c and a second receiving circuit 400c. The first transmitting circuit 100c and the first receiving circuit 200c may be connected in common to a first port PT1, and the second transmitting circuit 300c and the second receiving circuit 400c may be connected in common to a second port PT2.

In some example embodiments, the first RFIC 11c and the second RFIC 12c may use different wireless communication networks. In an example, the first RFIC 11c may transmit and receive signals according to a WiFi protocol, and the second RFIC 12c may transmit and receive signals using a Bluetooth protocol. In another example, the first RFIC 11c may transmit and receive signals using Bluetooth, and the second RFIC 12c may transmit and receive signals using WiFi.

The first transmitting circuit 100c may operate in one of an internal amplification transmitting mode and a receiving mode in a similar way to the transmitting circuit 100 of FIG.

2A. That is, the first transmitting circuit 100c may output a transmitting signal amplified by an internal amplifier positioned inside to the diplexer 40c via the first port PT1 in the transmitting mode, and impedance may be infinite due to resonance of the at least one mode setting circuit 140c in the receiving mode.

The second transmitting circuit 300c may operate in one of an external amplification transmitting mode and a receiving mode in a similar way to the transmitting circuit 100 of FIG. 2B. That is, the second transmitting circuit 300c may output a transmitting signal that is not amplified to the external amplifier 30c via the first port PT1 in the transmitting mode, and the external amplifier 30c may amplify and output the transmitting signal received from the second transmitting circuit 300c to the diplexer 40c. Impedance of the second transmitting circuit 300c may be high due to resonance of the at least one mode setting circuit 340c in the receiving mode.

The diplexer 40c may output a transmitting signal received from the first RFIC 11c or the second RFIC 12c to the outside via the antenna Ant. In addition, the diplexer 40c may output a receiving signal received from the antenna Ant to the first RFIC 11c or the second RFIC 12c. In some example embodiments, the diplexer 40c may output a received signal to the first RFIC 11c or the second RFIC 12c, based on a wireless communication network that the received signal uses.

In an example, when a wireless communication network that the received signal uses is WiFi, and the first RFIC 11c transmits and receives signals using WiFi, the diplexer 40c may output the received signal to the first RFIC 11c. In addition, since the first transmitting circuit 100c has a high impedance in the receiving mode, the signal received by the first RFIC 11c may be input to the first receiving circuit 200c.

Figure 11:
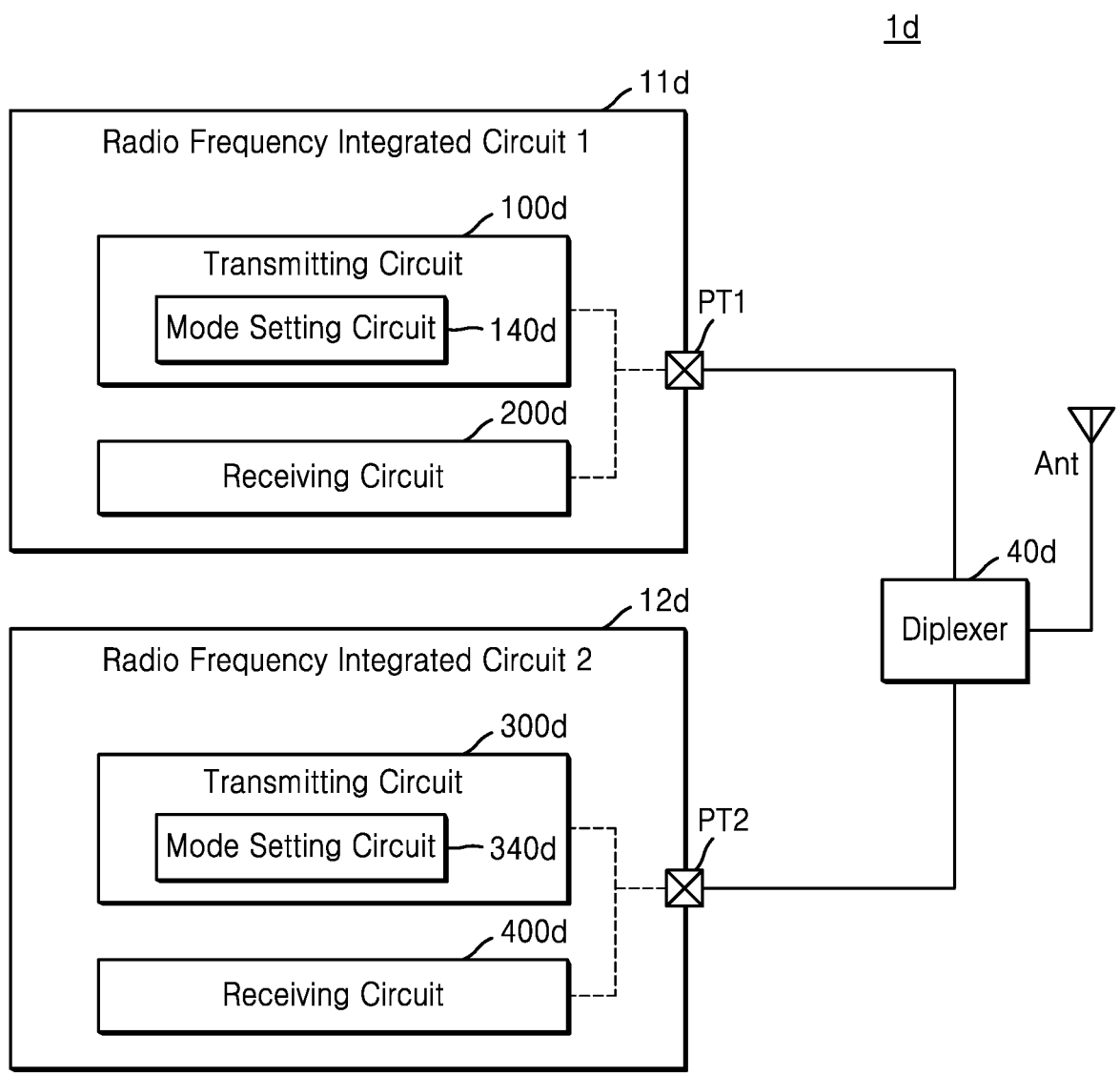
FIG. 11 is a block diagram illustrating a wireless communication device according to some example embodiments.

FIG. 11 is a block diagram illustrating a wireless communication device 1d according to some example embodiments. A repeated description of FIG. 10 is omitted below.

Referring to FIG. 11, the wireless communication device 1d may include a first RFIC 11d, a second RFIC 12d, and a diplexer 40d. The first RFIC 11d may include a first transmitting circuit 100d including at least one mode setting circuit 140d and a first receiving circuit 200d, and the second RFIC 12d may include a second transmitting circuit 300d including at least one mode setting circuit 340d and a second receiving circuit 400d. The first transmitting circuit 100d and the first receiving circuit 200d may be connected to the first port PT1 together, and the second transmitting circuit 300d and the second receiving circuit 400d may be connected to the second port PT2 together.

In some example embodiments, the first RFIC 11d and the second RFIC 12d may transmit and receive signals by using different operation frequencies. The first RFIC 11d may transmit and receive signals by using a first frequency, and the at least one mode setting circuit 140d included in the first transmitting circuit 100d may include a capacitor corresponding to the first frequency. The second RFIC 12d may transmit and receive signals by using a second frequency, and the at least one mode setting circuit 340d included in the second transmitting circuit 300d may include a capacitor corresponding to the second frequency.

The first transmitting circuit 100d may operate in one of an internal amplification transmitting mode and a receiving mode. That is, the first transmitting circuit 100d may output a transmitting signal amplified by an internal amplifier positioned inside to the diplexer 40d via the first port PT1 in the transmitting mode and may have a high impedance due to resonance of the at least one mode setting circuit 140d in the receiving mode.

Although not illustrated, in another example embodiment, when there is an external amplifier connected to the first transmitting circuit 100d, the first transmitting circuit 100d may operate in one of an external amplification transmitting mode and a receiving mode. That is, the first transmitting circuit 100d may output a transmitting signal that is not amplified to the external amplifier via the first port PT1 in the transmitting mode, and the external amplifier may amplify and output the transmitting signal received from the first transmitting circuit 100d to the diplexer 40d.

In a similar way to the first transmitting circuit 100d, the second transmitting circuit 300d may operate in one of an internal amplification transmitting mode and a receiving mode. That is, the second transmitting circuit 300d may output a transmitting signal amplified by an internal amplifier positioned inside to the diplexer 40d via the second port PT2 in the transmitting mode and may have a high impedance due to resonance of the at least one mode setting circuit 340d in the receiving mode.

Although not illustrated, in another example embodiment, when there is an external amplifier connected to the second transmitting circuit 300d, the second transmitting circuit 300d may operate in one of an external amplification transmitting mode and a receiving mode. That is, the second transmitting circuit 300d may output a transmitting signal that is not amplified to the external amplifier via the second port PT2 in the transmitting mode, and the external amplifier may amplify and output the transmitting signal received from the second transmitting circuit 300d to the diplexer 40d.

Figure 12:
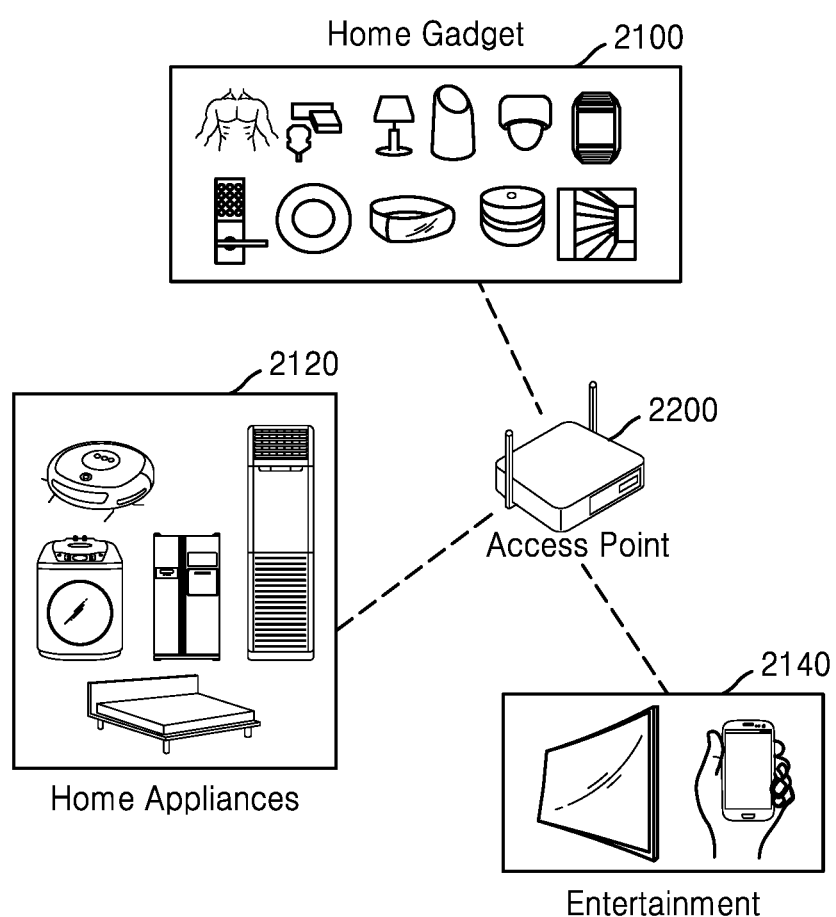
FIG. 12 is a diagram illustrating communication devices including a wireless communication device, according to some example embodiments.

FIG. 12 is a diagram illustrating communication devices including a wireless communication device, according to some example embodiments.

Referring to FIG. 12, a home gadget 2100, a home appliance 2120, an entertainment device 2140, and an access point (AP) 2200 may include an amplifying circuit according to some example embodiments. In some example embodiments, the home gadget 2100, the home appliance 2120, the entertainment device 2140, and the AP 2200 may configure an Internet of things (IoT) network system. The communication devices illustrated in FIG. 12 are merely examples, and it will be understood that other communication devices not illustrated in FIG. 12 may also include a wireless communication device according to some example embodiments.

The home gadget 2100, the home appliance 2120, the entertainment device 2140, and the AP 2200 may transmit and receive signals, using a wireless communication device according to one or more example embodiments described herein. In some example embodiments, the home gadget 2100, the home appliance 2120, the entertainment device 2140, and the AP 2200 may include a transmitting circuit including at least one mode setting circuit inside, and the transmitting circuit may be set differently according to a plurality of modes. Accordingly, the efficiency of signal transmission of the home gadget 2100, the home appliance 2120, the entertainment device 2140, and the AP 2200 may increase.

While the inventive concept has been particularly shown and described with reference to example embodiments thereof, it will be understood that various changes in form and details may be made therein without departing from the spirit and scope of the following claims.

What is claimed is:

1. A radio frequency integrated circuit (RFIC) comprising:
   a transmitting circuit configured to provide a first signal for transmission by an antenna via a port in a transmitting mode; and
   a receiving circuit configured to receive a second signal received from the antenna via the port in a receiving mode,
   wherein the transmitting circuit comprises:
      a transformer including a first coil which is connected to a power amplifier, and a second coil which is coupled to the first coil and connected to the port, the second coil being divided into a first portion and a second portion by a node, and
   a mode setting circuit including at least one capacitor and at least one switch, and configured to selectively activate a resonant operation between at least portion of the second coil and the at least one capacitor by controlling the at least one switch, and is connected to the transformer via the node between the first portion of the second coil and the second portion of the second coil.

2. The RFIC of claim 1, wherein operating modes of the RFIC comprises the receiving mode and the transmitting mode including a first transmitting mode and a second transmitting mode,
   wherein the first transmitting mode corresponds to the power amplifier amplifying the first signal and outputting the amplified signal to the port via the transformer and
   wherein the second transmitting mode corresponds to by passing the power amplifier, and
   wherein the at least one mode setting circuit is further configured to set the transmitting circuit into the first transmitting mode, the second transmitting mode, and the receiving mode by selectively activating the resonant operation.

3. The RFIC of claim 2, wherein the mode setting circuit comprises a first setting circuit and a second setting circuit;
   wherein the first setting circuit includes a first switch and a first capacitor, the first setting circuit being connected to the second coil of the transformer via the node and being configured to activate a first resonant operation between the first portion of the second coil and the first capacitor;
   wherein the second setting circuit includes a second switch and a second capacitor, the second setting circuit being connected between the first setting circuit and a first input terminal of the power amplifier, and being configured to activate a second resonant operation between the second portion of the second coil and the second capacitor.

4. The RFIC of claim 3, wherein the first transmitting mode corresponds to an internal amplification transmitting mode, and
   wherein none of the first resonant operation and the second resonant operation are activated in the first transmitting mode.

5. The RFIC of claim 3, wherein the second transmitting mode corresponds to an external amplification transmitting mode, and
   wherein the first resonant operation and the second resonant operation are both activated in the second transmitting mode.

6. The RFIC of claim 3, wherein, in the receiving mode, the second switch of the second setting circuit is open for blocking the second signal that flows into the transmitting circuit.

7. The RFIC of claim 3, wherein the first resonant operation is configured to generate an open circuit between the node and a ground node by resonating the first capacitor of the first setting circuit with the first portion of the second coil in parallel, and
   wherein the second resonant operation is configured to generate a short circuit between the port and the node by resonating the second capacitor with the second portion of the second coil in series.

8. The RFIC of claim 7, wherein $$C1 = \frac{1}{4\pi^2 f^2 L1} \text{ and } C2 = \frac{1}{4\pi^2 f^2 L2}$$

wherein L1 is an inductance L1 of the first portion of the second coil, wherein f is an operation frequency of the RFIC, wherein C1 is capacitance of the first capacitor, wherein L2 is an inductance of the second portion of the second coil, and wherein C2 is a capacitance of the second capacitor.

9. The RFIC of claim 7, wherein the second coil has a variable inductance and wherein the first capacitor and the second capacitor are variable capacitors.

10. The RFIC of claim 7, wherein the transmitting circuit further comprises:
   a third setting circuit including a third switch and a third capacitor,
   wherein the third setting circuit is configured to connect the third capacitor between a second input terminal of the power amplifier and the ground node, the third switch being open in the first transmitting mode and being closed in the second transmitting mode.

11. The RFIC of claim 3, wherein a turns ratio of the first portion of the second coil and the second portions of the second coil is 1:1.

12. The RFIC of claim 3, wherein the second coil is divided into a plurality of nodes,
   wherein the transmitting circuit further comprises a turns ratio switch configured to change a turns ratio of the first portion of the second coil and the second portions of the second coil by connecting the node and one node from among the plurality of nodes of the second coil.

13. The RFIC of claim 1, further configured to operate based on an operation frequency of one of wireless fidelity (Wi-Fi) and Bluetooth.

14. A wireless communication device comprising:
   an antenna; and
   a radio frequency integrated circuit (RFIC) configured to transmit a first signal or receive a second signal via the antenna and connected to the antenna via a single port,
   wherein the RFIC comprises:
   a transmitting circuit configured to selectively operate in a first transmitting mode, a second transmitting mode, and a receiving mode, wherein the transmitting circuit provides an amplified first signal to the port in the first transmitting mode and provides an unamplified first signal to the port in the second transmitting mode; and
   a receiving circuit coupled to the port,
   wherein the transmitting circuit comprises a coil which is divided into a first portion and a second portion by a node, and is coupled to the port and at least one mode setting circuit which is connected to the transmitting circuit via the node, and is configured to selectively set the transmitting circuit into the first transmitting mode, the second transmitting mode, and the receiving mode by selectively activating a resonant operation between at least portion of the coil of the transmitting circuit and at least one capacitor included in the at least one mode setting circuit.

15. The wireless communication device of claim 14, wherein the transmitting circuit further comprises:
   a driver circuit configured to generate a pre-transmission signal;
   a power amplifier configured to amplify the pre-transmission signal;
   a transformer comprising a first coil coupled to an output of the power amplifier and the coil coupled to the port;
   a first setting circuit including a first capacitor, and being connected to the node between the first portion and the second portion and configured to activate a first resonant operation between the first capacitor and the first portion of the coil; and
   a second setting circuit including a second capacitor, and being connected between a first input terminal of the power amplifier and the first setting circuit and being configured to active a second resonant operation between the second portion of the coil and the second capacitor.

16. The wireless communication device of claim 15, wherein the first setting circuit further comprises a first switch configured to connect the first capacitor in parallel with the first portion of the coil, and
   wherein the second setting circuit further comprises a second switch configured to connected the second capacitor in series between the first setting circuit and the first input terminal of the power amplifier.

17. The wireless communication device of claim 15, wherein the RFIC comprises a first RFIC, and wherein the wireless communication device further comprises:
   a second RFIC configured to be connected to the antenna via the single port; and
   a diplexer configured to selectively connect the ports of the first RFIC and the second RFIC to the antenna.

\* \* \* \* \*